US012005555B2

(12) United States Patent
Marsh et al.

(10) Patent No.: US 12,005,555 B2
(45) Date of Patent: Jun. 11, 2024

(54) ROTARY HAMMER

(71) Applicant: MILWAUKEE ELECTRIC TOOL CORPORATION, Brookfield, WI (US)

(72) Inventors: Julia C. Marsh, Milwaukee, WI (US); Kyle Greunke, Milwaukee, WI (US); Kevin A. McLachlan, Brookfield, WI (US)

(73) Assignee: MILWAUKEE ELECTRIC TOOL CORPORATION, Brookfield, WI (US)

(*) Notice: Subject to any disclaimer, the term of this patent is extended or adjusted under 35 U.S.C. 154(b) by 54 days.

(21) Appl. No.: 17/195,855

(22) Filed: Mar. 9, 2021

(65) Prior Publication Data

US 2021/0291338 A1 Sep. 23, 2021

Related U.S. Application Data

(60) Provisional application No. 62/993,153, filed on Mar. 23, 2020.

(51) Int. Cl.
*B25D 11/06* (2006.01)
*B25D 11/04* (2006.01)

(52) U.S. Cl.
CPC ............ *B25D 11/066* (2013.01); *B25D 11/04* (2013.01); *B25D 2211/003* (2013.01);
(Continued)

(58) Field of Classification Search
CPC . B25D 11/066; B25D 11/04; B25D 2211/003; B25D 2211/006;
(Continued)

(56) References Cited

U.S. PATENT DOCUMENTS 1,119,276 A * 12/1914 Griffith et al. ...... B23B 31/1071 279/75
1,656,450 A * 1/1928 Steuer ................ B23B 31/1071 279/22

(Continued)

FOREIGN PATENT DOCUMENTS

DE 1807273 A1 5/1970
DE 3634282 A1 3/1987

(Continued)

OTHER PUBLICATIONS

International Search Report and Written Opinion for Application No. PCT/US2021/021442 dated Jun. 25, 2021 (11 pages).

*Primary Examiner* — Joshua G Kotis
*Assistant Examiner* — Scott A Howell
(74) *Attorney, Agent, or Firm* — Michael Best & Friedrich LLP

(57) ABSTRACT

A rotary hammer includes a motor, a spindle coupled to the motor for receiving torque from the motor, a piston at least partially received within the spindle for reciprocation therein, a striker received within the spindle for reciprocation in response to reciprocation of the piston, and an anvil received within the spindle and positioned between the striker and the tool bit. The anvil is configured to impart axial impacts to the tool bit in response to reciprocation of the striker. The rotary hammer also includes a retainer received within the spindle for selectively securing the striker in an idle position in which it is inhibited from reciprocating within the spindle. The retainer includes a detent member configured to engage the striker to secure the striker in the idle position, and a tensing element configured to bias the detent member radially inward toward engagement with the striker.

20 Claims, 7 Drawing Sheets

(52) U.S. Cl.
CPC *B25D 2211/006* (2013.01); *B25D 2216/0069* (2013.01); *B25D 2250/321* (2013.01); *B25D 2250/365* (2013.01); *B25D 2250/371* (2013.01)

(58) Field of Classification Search
CPC ...... B25D 2216/0069; B25D 2250/321; B25D 2250/365; B25D 2250/371
See application file for complete search history.

(56) References Cited

U.S. PATENT DOCUMENTS

| | | | | |
|---|---|---|---|---|
| 2,409,899 | A * | 10/1946 | Resina | B67B 3/2066 279/22 |
| 4,582,144 | A * | 4/1986 | Mizutani | B25D 17/06 92/85 B |
| 4,798,249 | A | 1/1989 | Hoereth et al. | |
| 4,824,298 | A * | 4/1989 | Lippacher | B23Q 3/12 279/19.3 |
| 5,013,194 | A * | 5/1991 | Wienhold | B25B 23/0035 279/22 |
| 6,000,888 | A | 12/1999 | Hartman | |
| 6,913,089 | B2 * | 7/2005 | Stirm | B25D 16/00 173/104 |
| 7,500,811 | B2 * | 3/2009 | Pfob | B23B 31/083 279/82 |
| 7,810,817 | B1 * | 10/2010 | Gao | A61B 17/162 279/75 |
| 8,622,401 | B2 * | 1/2014 | Puzio | B25B 23/0035 279/75 |
| 8,720,599 | B2 | 5/2014 | Ikuta | |
| 9,561,580 | B2 * | 2/2017 | Chen | B24B 45/006 |
| 11,554,468 | B2 * | 1/2023 | Duncan | B25B 23/0007 |
| 2006/0186614 | A1 * | 8/2006 | Pfob | B23B 31/083 279/80 |
| 2007/0152408 | A1 * | 7/2007 | Peters | B23B 31/107 279/143 |
| 2008/0217039 | A1 * | 9/2008 | Fuenfer | B25D 17/00 173/128 |
| 2008/0283264 | A1 * | 11/2008 | Ikuta | B25D 11/125 173/211 |
| 2010/0219593 | A1 * | 9/2010 | Puzio | B25B 23/0057 279/30 |
| 2011/0298187 | A1 | 12/2011 | Ontl et al. | |
| 2013/0153253 | A1 * | 6/2013 | Ludy | B25D 11/005 173/133 |
| 2015/0251295 | A1 * | 9/2015 | Chen | B24D 13/20 451/509 |
| 2019/0314971 | A1 * | 10/2019 | Yoshikane | B25D 11/064 |
| 2021/0114195 | A1 * | 4/2021 | Yoshikane | B25D 11/062 |
| 2021/0291338 | A1 * | 9/2021 | Marsh | B25D 11/04 |

FOREIGN PATENT DOCUMENTS

| | | | |
|---|---|---|---|
| DE | 102008000727 | A1 | 9/2009 |
| EP | 218547 | B1 | 6/1990 |
| JP | 2015226976 | A | 12/2015 |
| JP | 2019181683 | A | 10/2019 |
| KR | 1020090008192 | A | 1/2009 |
| WO | 2009036526 | A1 | 3/2009 |

* cited by examiner

ROTARY HAMMER

CROSS-REFERENCE TO RELATED APPLICATIONS

This application claims priority to U.S. Provisional Patent Application No. 62/993,153, filed Mar. 23, 2020, the entire content of which is hereby incorporated by reference.

FIELD OF THE INVENTION

The present invention relates to power tools, and more specifically to rotary hammers.

BACKGROUND OF THE INVENTION

Rotary hammers typically include a rotatable spindle, a reciprocating piston within the spindle, and a striker that is selectively reciprocable within the piston in response to an air pocket developed between the piston and the striker. Rotary hammers also typically include an anvil that is impacted by the striker when the striker reciprocates within the piston. The impact between the striker and the anvil is transferred to a tool bit, causing it to reciprocate for performing work on a work piece.

SUMMARY OF THE INVENTION

The present invention provides, in one aspect, a rotary hammer adapted to impart axial impacts to a tool bit. The rotary hammer includes a motor, a spindle coupled to the motor for receiving torque from the motor, a piston at least partially received within the spindle for reciprocation therein, a striker received within the spindle for reciprocation in response to reciprocation of the piston, and an anvil received within the spindle and positioned between the striker and the tool bit. The anvil is configured to impart axial impacts to the tool bit in response to reciprocation of the striker. The rotary hammer also includes a retainer received within the spindle for selectively securing the striker in an idle position in which it is inhibited from reciprocating within the spindle. The retainer includes a detent member configured to engage the striker to secure the striker in the idle position, and a tensing element configured to bias the detent member radially inward toward engagement with the striker.

In some embodiments, the retainer defines an outer circumferential groove that receives the tensing element.

The present invention provides, in another aspect, a rotary hammer adapted to impart axial impacts to a tool bit, the rotary hammer includes a motor, a spindle, a piston at least partially received within the spindle for reciprocation therein, a striker received within the spindle for reciprocation in response to reciprocation of the piston, and an anvil received within the spindle and positioned between the striker and the tool bit. The anvil is configured to impart axial impacts to the tool bit in response to reciprocation of the striker. The rotary hammer also includes a retainer received within the spindle for selectively securing the striker in an idle position in which it is inhibited from reciprocating within the spindle, the retainer defining a detent pocket. The retainer includes a detent member received into the detent pocket and configured to engage the striker to secure the striker in the idle position, and an elastic ring formed from an elastomer and configured to bias the detent member radially inward toward engagement with the striker.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
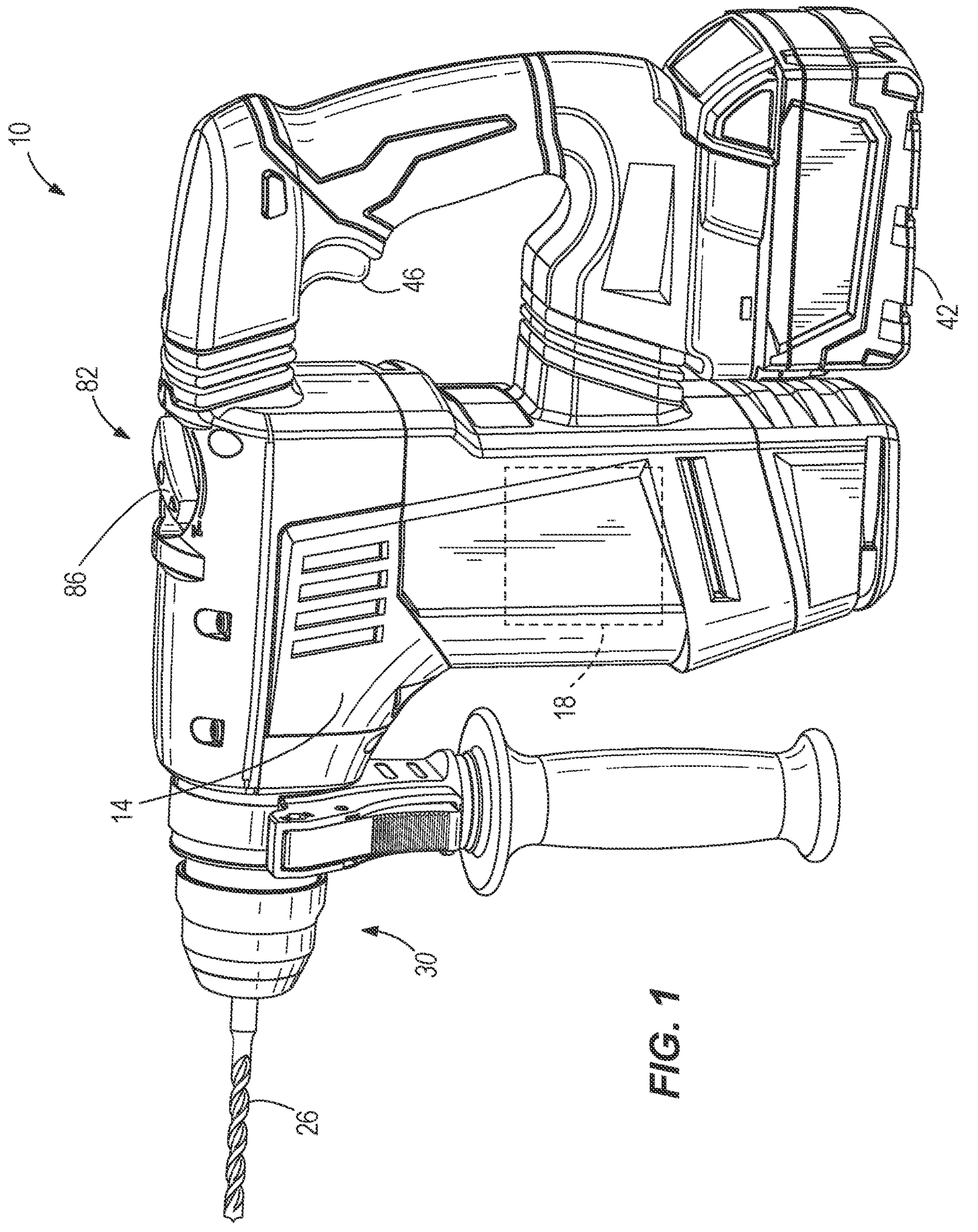
FIG. 1 is a rear perspective view of a rotary hammer in accordance with an embodiment of the invention.
Figure 2:
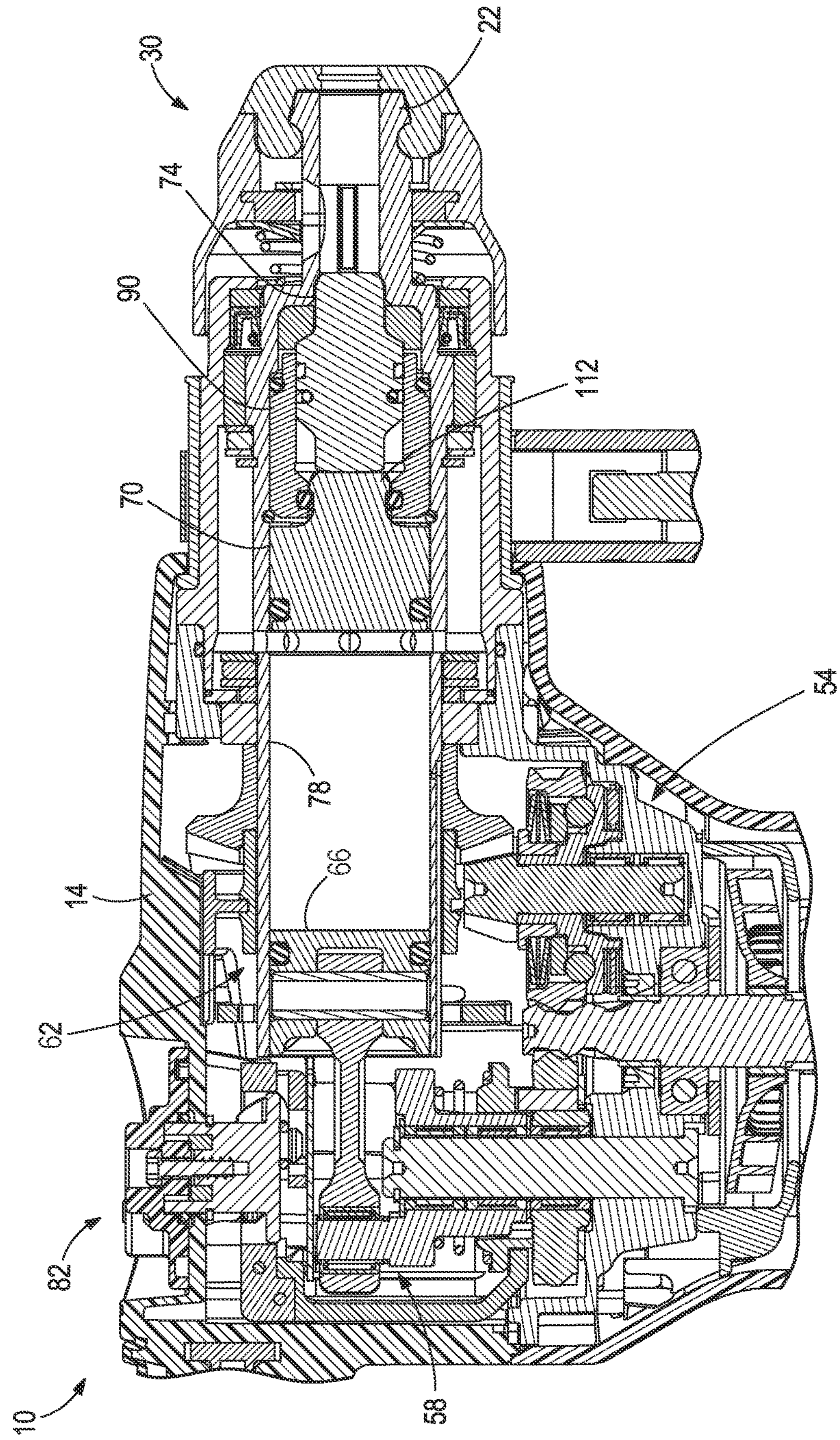
FIG. 2 is a cross-sectional view of the rotary hammer of FIG. 1.

FIGS. 1 and 2 illustrate a power tool in the form of a hammer tool or rotary hammer 10. The rotary hammer 10 includes a housing 14, a motor 18 disposed within the housing 14, and a rotatable spindle 22 coupled to the motor 18 for receiving torque from the motor 18. As shown in FIG. 1, a tool bit 26 may be secured to the spindle 22 for co-rotation with the spindle 22 (e.g., using a spline fit). In the illustrated construction, the rotary hammer 10 includes a quick-release mechanism 30 coupled for co-rotation with the spindle 22 to facilitate quick removal and replacement of different tool bits 26.

In the illustrated construction of the rotary hammer 10, the motor 18 is configured as a DC motor 18 that receives power from an on-board power source (e.g., a battery 42). The battery 42 may include any of a number of different nominal voltages (e.g., 12V, 18V, etc.), and may be configured having a Lithium-based chemistry (e.g., Lithium, Lithium-ion, etc.) or any other suitable chemistry. Alternatively, the motor 18 may be powered by a remote power source (e.g., a household electrical outlet) through a power cord. The motor 18 is selectively activated by depressing a trigger 46 which, in turn, actuates a switch (not shown). The switch may be electrically connected to the motor 18 via a top-level or master controller, or one or more circuits, for controlling operation of the motor 18.

With continued reference to FIG. 2, the rotary hammer 10 also includes a rotational drive assembly 54 for transferring torque from the motor 18 to the spindle 22, a reciprocation drive assembly 58 detachably coupled to the motor 18 for converting torque from the motor 18 to reciprocating motion, and an impact mechanism 62 coupled to the reciprocation drive assembly 58 to develop a reciprocal impact force imparted on the tool bit 26. The impact mechanism 62 includes a reciprocating piston 66 coupled to the reciprocation drive assembly 58 and disposed within the spindle 22, a striker 70 that is selectively reciprocable within the spindle 22 in response to reciprocation of the piston 66, and an anvil 74 that is impacted by the striker 70 when the striker 70 reciprocates toward the tool bit 26. The impact between the striker 70 and the anvil 74 is transferred to the tool bit 26, causing it to reciprocate for performing work on a work piece. In the illustrated construction of the rotary hammer 10, the spindle 22 is hollow and defines an interior chamber 78 in which the striker 70 is received. An air pocket is developed between the piston 66 and the striker 70 when the piston 66 reciprocates within the spindle 22, whereby expansion and contraction of the air pocket induces reciprocation of the striker 70.

With reference to FIG. 1, the rotary hammer 10 includes a mode selection mechanism 82 operable to selectively switch the reciprocation drive assembly 58 between a first state operatively de-coupled from the motor 18, and a second state operatively coupled thereto. The mode selection mechanism 82 includes a mode selection actuator 86 that is accessible by an operator of the rotary hammer 10 to actuate the mode selection mechanism 82, and thereby switch the rotary hammer 10 between a "drill" mode, in which the reciprocation drive assembly 58 is operatively de-coupled from the motor 18 and the impact mechanism 62 is deactivated, and a "hammer-drill" mode, in which the reciprocation drive assembly 58 is operatively coupled to the motor 18 and the impact mechanism 62 is activated.

Figure 6:
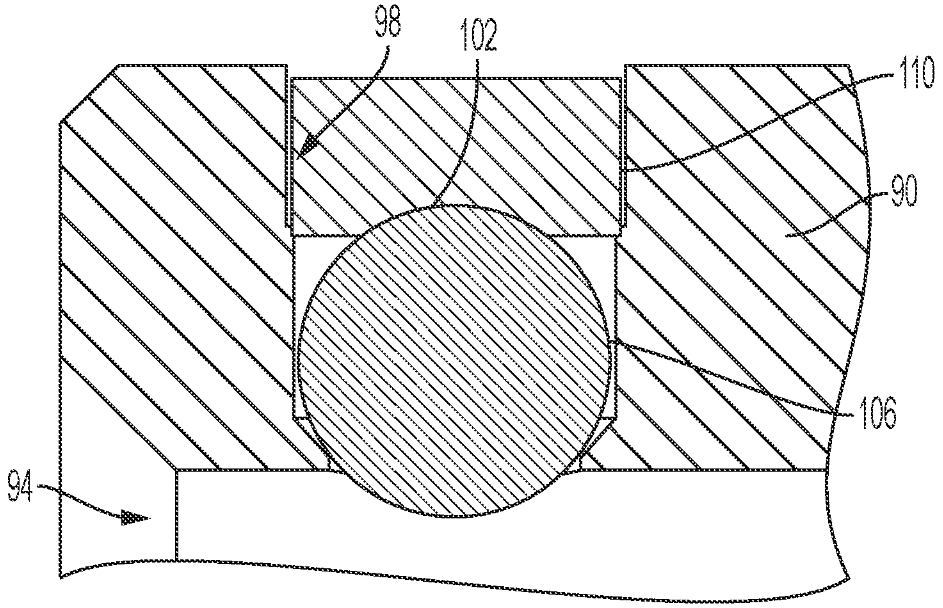
FIG. 6 is an enlarged view of a portion of the rotary hammer shown in FIG. 2, illustrating the rotary hammer in the "hammer" mode.

With reference to FIGS. 2-5, the impact mechanism 62 further includes a retainer 90 for securing the striker 70 in an "idle" position (shown in FIG. 4) in which the striker 70 is inhibited from reciprocating within the spindle 22. The retainer 90 includes a central bore 94, an outer circumferential groove 98 (FIGS. 6 and 7) formed in an outer peripheral surface of the retainer 90, and one or more detent pockets 102 formed radially inward from the groove 98 and communicating with the groove 98 and with the central bore 94. A detent member 106 is positioned within each detent pocket 102, and an elastic tensing element 110 is received into the outer circumferential groove 98 to bias the detent members 106 radially inward so that the detent members 106 protrude partially into the central bore 94. In the illustrated embodiment, the retainer 90 includes a plurality of detent pockets 102 each receiving a detent member 106, but in other embodiments (not shown), the retainer can include just a single detent pocket containing a single detent member. In the illustrated embodiment, the detent members 106 are configured as ball bearings 106, but the detent members 106 can also be provided in other forms (e.g., metal pins, etc.). Likewise, the tensing element 110 of the illustrated embodiment is configured as an elastic ring 110 made from an elastomer (e.g., such as rubber), but in other embodiments, the tensing element may take on other forms (e.g., a metal snap ring, one or more compression springs, etc.). Specifically, in an embodiment shown in FIG. 8, the tensing element 110 includes multiple compression springs 111 positioned within the retainer 90. Each compression spring 111 biases a respective detent member 106 radially inward toward the central bore 94.

Referring again to FIGS. 2-5, the detent pockets 102, at their radially innermost end, include a diameter that is less than the diameter of the ball bearings 106. Thus, the ball bearings 106 may partially protrude into the central bore 94 but cannot fall through the pockets 102. Thus, the ball bearings 106 are trapped between the radially innermost end of the pockets 102 and the elastic ring 110.

Figure 3:
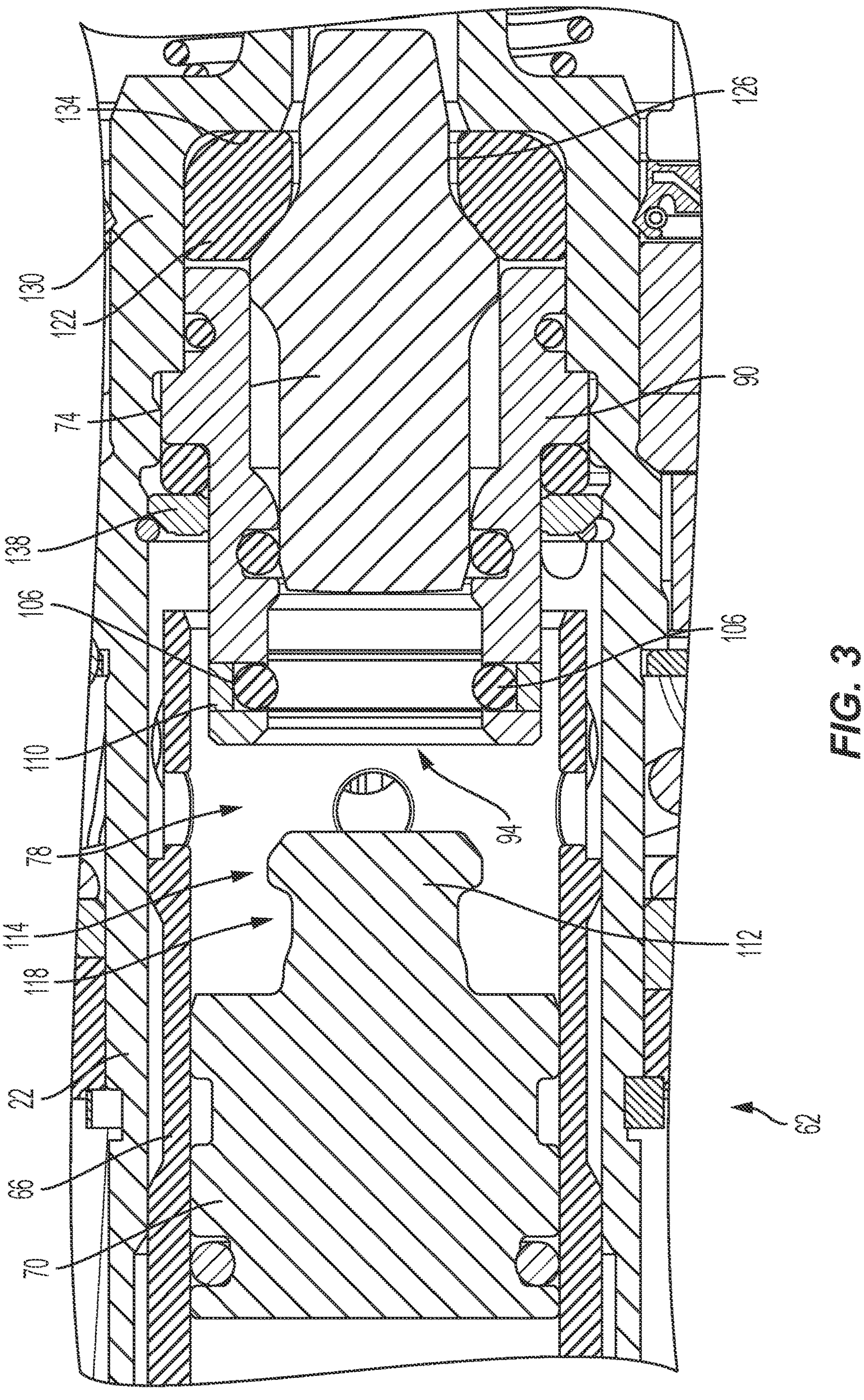
FIG. 3 is an enlarged view of a portion of the rotary hammer shown in FIG. 2, illustrating the rotary hammer in a "hammer" mode.
Figure 4:
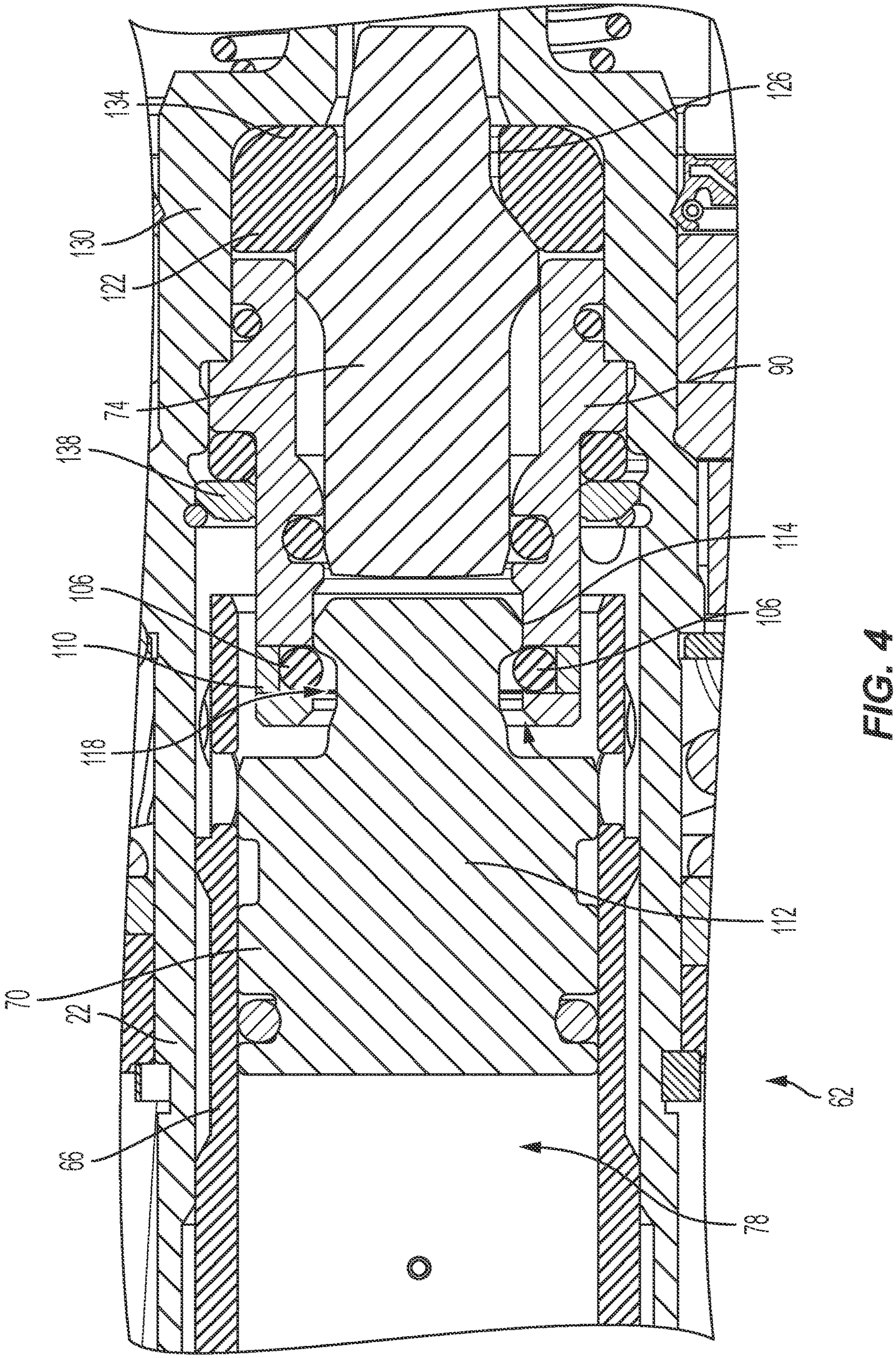
FIG. 4 is an enlarged view of a portion of the rotary hammer shown in FIG. 2, illustrating the rotary hammer in an "idle" mode.
Figure 5:
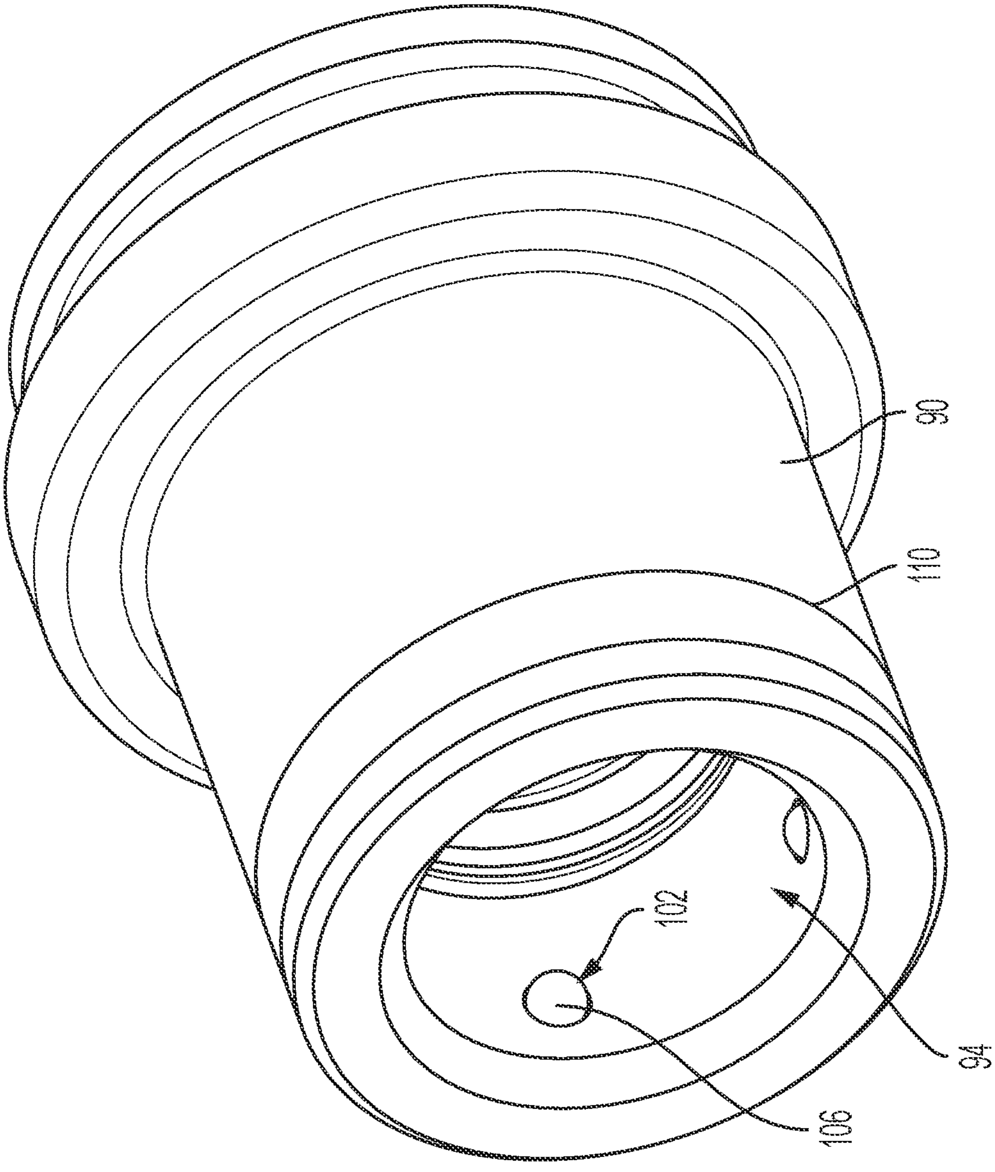
FIG. 5 is a perspective view of an anvil sleeve of the rotary hammer of FIG. 1.

With reference to FIGS. 3 and 4, the striker 70 includes a barb 112 having a front nose portion 114 that defines an outer diameter greater than the distance between opposed pairs of the detent members 106, and a circumferential groove 118 formed in an outer peripheral surface of the barb 112 just behind the nose portion 114. As such, the barb 112 of the striker 70 is engageable with the detent members 106 in the retainer 90 when assuming the idle position as shown in FIG. 4 and further discussed below.

An elastic member 122 is positioned between the retainer 90 and the spindle 22, and disposed around an outer peripheral surface of the anvil 74. Particularly, the spindle 22 includes a step 130 defining an interior annular surface 134, and the elastic member 122 is positioned between the retainer 90 and the annular surface 134 of the spindle 22. An internal snap ring 138 defines a rearward extent to which the retainer 90 is movable relative to the spindle in an axial direction from the frame of reference of FIG. 4.

Figure 7:
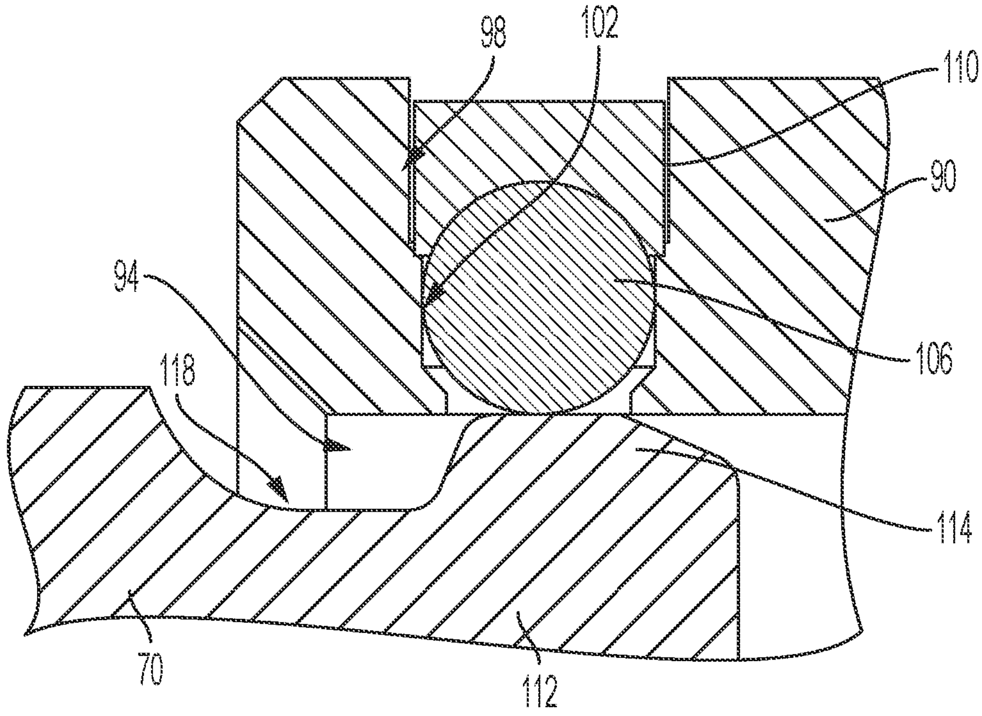
FIG. 7 is an enlarged view of a portion of the rotary hammer shown in FIG. 2, illustrating the rotary hammer transitioning from the "hammer" mode to the "idle" mode.
Figure 8:
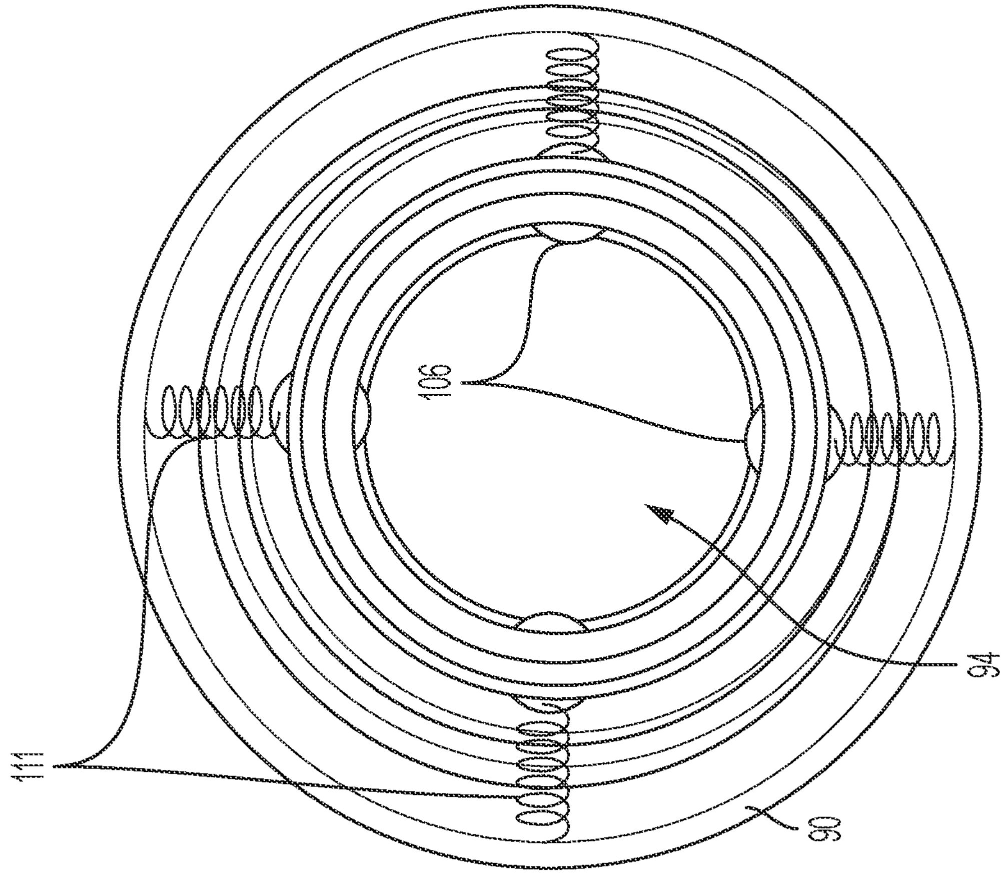
FIG. 8 is a schematic view of a retainer of the rotary hammer of FIG. 1.

When the tool bit 26 of the rotary hammer 10 is depressed against a workpiece, the tool bit 26 pushes the striker 70 (via the anvil 74) rearward toward an "impact" position, shown in FIG. 3. During operation of the rotary hammer 10 in the hammer-drill mode, the piston 66 reciprocates within the spindle 22 to draw the striker 70 rearward and then accelerate it forward toward the anvil 74 for impact. When the tool bit 26 is removed from the workpiece, the rotary hammer 10 may transition from the hammer-drill mode to an "idle" mode, in which the striker 70 is captured by the retainer 90 in the idle position shown in FIG. 4 and prevented from further reciprocation within the piston 66. To assume the idle position, the striker 70 moves forward toward the retainer 90 so that the barb 112 enters the central bore 94 and engages the detent members 106 as shown in FIG. 7. The nose portion 114 first enters the central bore 94 and displaces the detent members 106 radially outward against the bias of the tensing element 110, thereby developing tension within (i.e., stretching) the tensing element 110. Upon the detent members 106 encountering the circumferential groove 118, the tensing element 110 rebounds to an unstretched or partially stretched shape, thereby displacing the detent members 106 in a radially inward direction to hold the striker 70 in the idle position (FIG. 4).

Rotary hammers typically utilize a rubber catch O-ring within the retainer to capture the barb of the striker. But, such a rubber catch O-ring may wear over time, reducing the effectiveness of the O-ring until the striker may no longer park in the idle position. In contrast, the detent members 106 of the rotary hammer 10 can be formed from more durable materials (e.g., steel, etc.) that resist wear from repeated engagement with the striker 70 and prolong the life of the rotary hammer 10.

Prior to being captured in the idle position, the striker 70 impacts the retainer 90 to displace the retainer 90 toward the elastic member 122, so that the retainer 90 applies a compressive load to the elastic member 122. The inner diameter of the elastic member 122 is reduced as a result of being compressed. The compression of the elastic member 122 imparts a frictional force on the outer peripheral surface 126 of the anvil 74, thereby decelerating or "parking" the anvil 74 within the spindle 22. As such, transient movement of the anvil 74 upon the rotary hammer 10 transitioning from the hammer-drill mode to the idle mode is reduced.

Various features of the disclosure are set forth in the following claims.

What is claimed is:

1. A rotary hammer adapted to impart axial impacts to a tool bit, the rotary hammer comprising:
a motor;
a spindle coupled to the motor for receiving torque from the motor;
a piston at least partially received within the spindle for reciprocation therein;
a striker received within the spindle for reciprocation in response to reciprocation of the piston, the striker defining a longitudinal axis;
an anvil received within the spindle and positioned between the striker and the tool bit, the anvil configured to impart axial impacts to the tool bit in response to reciprocation of the striker; and
a retainer received within the spindle for selectively securing the striker in an idle position in which it is inhibited from reciprocating within the spindle, the retainer including
at least one detent member configured to engage the striker to secure the striker in the idle position,
a circumferential groove on an outer periphery of the retainer, and
a tensing element received within the circumferential groove and directly applying a force against the at least one detent member in a radially inward direction toward engagement with the striker in a direction perpendicular to the longitudinal axis of the striker.

2. The rotary hammer of claim 1, wherein the tensing element comprises an elastic ring formed from an elastomer, and wherein the at least one detent member is a ball bearing.

3. The rotary hammer of claim 1, wherein the retainer defines a central bore, a detent pocket communicating with the circumferential groove and with the central bore, and wherein the at least one detent member is received into the detent pocket.

4. The rotary hammer of claim 3, wherein the tensing element comprises an elastic ring formed from an elastomer.

5. The rotary hammer of claim 4, wherein the striker includes a barb that defines an annular groove configured to receive the at least one detent member to secure the striker in the idle position.

6. The rotary hammer of claim 5, wherein to assume the idle position, the striker moves toward the retainer so that the barb enters the central bore.

7. The rotary hammer of claim 1, wherein the retainer is movable relative to the spindle in an axial direction.

8. The rotary hammer of claim 7, further comprising an elastic member positioned between the retainer and the spindle and disposed around an outer peripheral surface of the retainer, and wherein the retainer is movable toward the elastic member and configured to apply a compressive load to the elastic member to reduce an inner diameter of the elastic member.

9. A rotary hammer adapted to impart axial impacts to a tool bit, the rotary hammer comprising:
a motor;
a spindle;
a piston at least partially received within the spindle for reciprocation therein;
a striker received within the spindle for reciprocation in response to reciprocation of the piston, the striker defining a longitudinal axis;
an anvil received within the spindle and positioned between the striker and the tool bit, the anvil configured to impart axial impacts to the tool bit in response to reciprocation of the striker; and
a retainer received within the spindle for selectively securing the striker in an idle position in which it is inhibited from reciprocating within the spindle, the retainer defining at least one detent pocket, the retainer including:
at least one detent member received into the at least one detent pocket and configured to engage the striker to secure the striker in the idle position, and
an elastic ring formed from an elastomer directly applying force against the at least one detent member in a radially inward direction toward engagement with the striker in a direction perpendicular to the longitudinal axis of the striker.

10. The rotary hammer of claim 9, wherein the retainer defines an outer circumferential groove that receives the elastic ring.

11. The rotary hammer of claim 10, wherein:
the at least one detent pocket is a first detent pocket, and the retainer further defines a second detent pocket;
the at least one detent member is a first detent member, and the retainer further includes a second detent member, the first detent member received in the first detent pocket and the second detent member received in the second detent pocket;
the retainer defines a central bore; and
the first and second detent pockets communicate with the outer circumferential groove and with the central bore.

12. The rotary hammer of claim 11, wherein the striker includes a barb that defines an annular groove configured to receive the plurality of detent members to secure the striker in the idle position.

13. The rotary hammer of claim 12, wherein to assume the idle position, the striker moves toward the retainer so that the barb enters the central bore.

14. The rotary hammer of claim 13, wherein the barb further defines a nose portion having a diameter that is greater than a distance measured between opposed pairs of the plurality of detent members.

15. The rotary hammer of claim 9, wherein the retainer is movable relative to the spindle in an axial direction.

16. The rotary hammer of claim 15, further comprising an elastic member positioned between the retainer and the spindle and disposed around an outer peripheral surface of the retainer, and wherein the retainer is movable toward the elastic member and configured to apply a compressive load to the elastic member to reduce an inner diameter of the elastic member.

17. The rotary hammer of claim 9, further comprising a rotational drive assembly configured to transfer torque from the motor to the spindle.

18. The rotary hammer of claim 9, further comprising a reciprocation drive assembly detachably coupled to the motor and configured to convert torque from the motor to reciprocating motion of the piston.

19. The rotary hammer of claim 1, wherein the at least one detent member is a first detent member, and the retainer further includes a second detent member, wherein the tensing element engages the first and second detent members to bias the first and second detent members radially inward toward engagement with the striker.

20. The rotary hammer of claim 9, wherein the at least one detent member is a first detent member, and the retainer further includes a second detent member, wherein the elastic ring engages the first and second detent members to bias the first and second detent members radially inward toward engagement with the striker.

* * * * *